(12) United States Patent
Liu

(10) Patent No.: US 8,812,003 B2
(45) Date of Patent: Aug. 19, 2014

(54) METHOD AND EVOLVED NODE BASE-STATION FOR AVOIDING OCCURRENCE OF HANDOFF BETWEEN ADJACENT CELL

(75) Inventor: Jing Liu, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 140 days.

(21) Appl. No.: 13/257,818

(22) PCT Filed: Apr. 20, 2010

(86) PCT No.: PCT/CN2010/071921
§ 371 (c)(1),
(2), (4) Date: Oct. 20, 2011

(87) PCT Pub. No.: WO2011/017934
PCT Pub. Date: Feb. 17, 2011

(65) Prior Publication Data
US 2012/0077502 A1    Mar. 29, 2012

(30) Foreign Application Priority Data

Aug. 13, 2009    (CN) .......................... 2009 1 0167308

(51) Int. Cl.
*H04W 36/00*    (2009.01)
*H04W 36/24*    (2009.01)

(52) U.S. Cl.
CPC ................... *H04W 36/245* (2013.01); *H04W 36/0083* (2013.01)
USPC ........ 455/438; 455/436; 455/452.2; 455/453; 370/331; 370/332

(58) Field of Classification Search
USPC ........ 455/438, 436, 452.2, 453; 370/331, 332
See application file for complete search history.

(56) References Cited

U.S. PATENT DOCUMENTS

| 7,493,120 B2 * | 2/2009 | Kim et al. ...................... 455/436 |
| 2006/0258386 A1 * | 11/2006 | Jeong et al. ................... 455/525 |

FOREIGN PATENT DOCUMENTS

| CN | 1258177 A | 6/2000 |
| WO | 2008113373 A1 | 9/2008 |

OTHER PUBLICATIONS

International Search Report for PCT/CN2010/071921 dated Jul. 16, 2010.

* cited by examiner

*Primary Examiner* — Patrick Edouard
*Assistant Examiner* — Chuck Huynh
(74) *Attorney, Agent, or Firm* — Ling Wu; Stephen Yang; Ling and Yang Intellectual Property

(57) ABSTRACT

A method and an Evolved Node Base-station (eNB) for avoiding an occurrence of a ping-pong handover between adjacent cells are provided. The eNB comprises: a statistics module, a storage module, a judging module and a parameter adjusting module. The method includes: during a statistics period, eNBs serving two adjacent cells involved in a ping-pong handover, making a statistics on times of the serving cell of the eNB being used as a source cell and a target cell in a second handover in a process of each ping-pong handover occurring between the two adjacent cells respectively; upon the end of the statistics period, if the eNB determines that the times of the serving cell of the eNB being used as the source cell in the second handover is greater than the times of as the target cell, the eNB increasing a value of a handover control parameter of this serving cell.

11 Claims, 3 Drawing Sheets

METHOD AND EVOLVED NODE BASE-STATION FOR AVOIDING OCCURRENCE OF HANDOFF BETWEEN ADJACENT CELL

TECHNICAL FIELD

The present invention relates to a Long Term Evolution (LTE) communication system, and in particular, to a method and an Evolved Node Base-station (eNodeB, eNB) for avoiding occurrence of ping-pong handover between adjacent cells.

BACKGROUND ART

Mobility management is an important attribute in a mobile communication system, and handover is a key part of mobility management, since a reasonable handover act can decrease spending made by the system to realize mobility.

In a LTE system, the state of a User Equipment (UE) can be RRC_CONNECTED and RRC_IDLE. When a UE in RRC_CONNECTED state moves from a serving cell to another cell, it will trigger a cross-cell handover in order to ensure continuity of the services.

During the process of the handover, the UE firstly measures the currently serving cell and the adjacent cell according to a measurement control message issued by the Evolved Node B (eNB) in the LTE system, and processes and analyzes the measurement result according to the handover control parameters in the measurement control message, and if the handover condition is satisfied, then it reports the handover event to the eNB, and the eNB then prepares and executes the handover. In this process, the configuration of the handover control parameter determines whether the time of handover occurrence is suitable or not, if the parameter is configured to be too low and the handover condition can be easily satisfied, then ping-pong handover between the serving cell and the target cell is apt to occur. Ping-pong handover increase the spending of the communication system for ensuring mobility of the user, and thus should be avoided as far as possible.

The current method for avoiding ping-pong handover is: when a UE successfully hands over from a cell 1 to a cell 2, the eNB starts a timer $T_{pingpong}$; before the timer $T_{pingpong}$ times out, if the eNB receives a measurement event report, in which the event type is handover and the target cell is the cell 1, reported by the UE again, then the eNB discards the report, that is, it does not originate handover act to the cell 1. When the timer $T_{pingpong}$ times out, if the eNB receives a measurement event report with the target cell being the cell 1, reported by the UE again, and the handover condition is satisfied, it is allowed to originate the handover act to the cell 1.

This kind of processing means begins with limiting the handover act of a single UE, which seemingly limits the probability of the occurrence of ping-pong handover, but actually does not reduce the possibility of occurrence of ping-pong handover radically.

In the meantime, the way of using a timer has a problem—there is a high requirement on configuration of the duration of the timer. If the duration is configured to be too short, then ping-pong handover cannot be efficiently controlled; if the duration is configured to be too long, then it may lead to the result that the UE cannot hand over back to the original serving cell in time after the handover if the quality of the target cell is too bad, thus causing a call drop. As shown in FIG. 1, the arrow indicates the moving direction of the user, and after the users hands over from a cell 1 to a cell 2, the second handover back to the cell 1 in a short time period is reasonable, but the method in the prior art limits such a correct handover act, which may cause a call drop due to untimely handover.

SUMMARY OF THE INVENTION

The technical problem to be solved in the present invention is to provide a method and Evolved Node B (eNB) for avoiding occurrence of ping-pong handover between adjacent cells, so as to avoid ping-pong handover between two adjacent cells due to improper configuration of the handover parameter (i.e., then handover criterion can be easily satisfied).

In order to solve the above problem, the present invention provides a method for avoiding occurrence of ping-pong handover between adjacent cells, comprising the following steps of:

during a statistics period, the eNBs serving two adjacent cells firstly determining an occurrence of a ping-pong handover between the two adjacent cells, and then making statistics on the times of the serving cell of the eNB being used as a source cell and a target cell in a second handover in a process of each ping-pong handover occurring between the two adjacent cells respectively;

upon end of the statistics period, if the eNB determines that the times of the serving cell of the eNB being used as a source cell in the second handover is greater than the times of being used as a target cell, the eNB increasing a value of a handover control parameter of the serving cell of the eNB.

The above method may be also characterized in that:

in said step of determining an occurrence of a ping-ping handover between the two adjacent cells, if the eNB judges that a user equipment (UE) has handed over between the serving cell of the eNB and the adjacent cell continuously for three times within a duration of a ping-pong judging threshold value, the UE is considered to be undergoing a ping-pong handover between the two adjacent cells.

The above method may be also characterized in that:

said step of determining an occurrence of a ping-ping handover between the two adjacent cells comprises:

A. when the eNB knows that the UE has handed over from or handed over to the serving cell of the eNB, the eNB judging, according to a history information cell of the UE, whether the former two handovers of the UE both occur between the two adjacent cells involved in this handover, if yes, executing step B; if not, executing step C;

B. judging whether a sum of the residing durations of the UE in each cell after the former two handovers is less than or equal to a preset ping-pong judging threshold value, if yes, it is considered that this handover and the former two handovers constitute a ping-ping handover of the UE between the two adjacent cells; if not, executing step C;

C. the eNB continuing to wait for the UE to report a handover-to or handover-from notifying message, and executing step A after receiving the notifying message.

The above method may be also characterized in that:

the process that the UE has handed over between the two adjacent cells continuously for three times includes the following two scenes:

Scene A: the UE continuously hands over between two adjacent cells, a cell 1 and a cell 2, wherein the UE hands over from the cell 1 to the cell 2 for two times, and hands over from the cell 2 to the cell 1 once;

Scene B: the UE continuously hands over between the cell 1 and the cell 2, wherein the UE hands over from the cell 2 to the cell 1 for two times, and hands over from the cell 1 to the cell 2 once;

then in said step of the eNB making statistics on the times of the serving cell of the eNB being used as a source cell and a target cell in a second handover in a process of a ping-pong handover during a statistics period, the eNB makes statistics on the times of the occurrences of Scene A and Scene B in the statistics period for the UE.

The above method may be also characterized in that:
the eNB is configured with a step length;
said step of the eNB increasing the value of the handover control parameter of the serving cell of the eNB comprises: adding the step length to the original handover control parameter.

The above method may be also characterized in that:
the method further comprises: presetting an adjusting determination parameter Δ in the eNB;
when the eNB judges that the times of the serving cell of the eNB being used as a source cell in the second handover is greater than the times of being used as a target cell, the step of the eNB increasing the value of the handover control parameter of the local cell comprises: the eNB increasing the value of the handover control parameter of the local cell when the eNB judges that the times of the serving cell of the eNB being used as a source cell in the second handover is greater than a sum of the times of being used as a target cell and Δ.

The method further comprises:
the eNB increasing the value of the handover control parameter of the serving cell of the eNB when the eNB judges that an absolute value of a difference between the times of the serving cell of the eNB being used as a target cell and the times of being used as a source cell in the second handover is less than Δ.

The method further comprises:
the eNB not adjusting the value of the handover control parameter of the serving cell of the eNB when the eNB judges that the times of the serving cell of the eNB being used as a target cell in the second handover is greater than a sum of the times of being used as a source cell and Δ.

The above method may be also characterized in that:
the handover control parameter includes any one of Time to Trigger, Hysteresis, Cell Individual Offset, and Threshold, and any combination thereof.

In order to solve the above problem, the present invention further provides an Evolved Node Base-station (eNB) for avoiding occurrence of ping-pong handover between adjacent cells, comprising: a statistics module, a storage module, a judging module and a parameter adjusting module;

the statistics module is configured to make statistics on times of the serving cell of the eNB being used as a source cell and a target cell in a second handover in a process of each ping-pong handover occurring between the cell and an adjacent cell, and updating the times to the storage module;

the storage module is configured to store information about the times counted by the statistics module and a value of a handover control parameter of the serving cell;

the judging module is configured to send a parameter increasing command to the parameter adjusting module if it is judged upon end of a statistics period that the times of the serving cell being used as a source cell in the second handover is greater than the times of being used as a target cell;

the parameter adjusting module is configured to increase the value of the handover control parameter of the serving cell stored in the storage module after receiving the parameter increasing command.

The above eNB is also characterized in that:
the statistics module is also configured to determine that a user equipment (UE) is undergoing a ping-pong handover between the serving cell and an adjacent cell when judging that the UE has handed over between the serving cell and the adjacent cell continuously for three times within a duration of a ping-pong judging threshold value.

The above eNB is also characterized in that:
the process that the UE has undergone three handovers between the two adjacent cells continuously includes the following two scenes:
Scene A: the UE continuously hands over between two adjacent cells, a cell 1 and a cell 2, wherein the UE hands over from the cell 1 to the cell 2 for two times, and hands over from the cell 2 to the cell 1 once;
Scene B: the UE continuously hands over between the cell 1 and the cell 2, wherein the UE hands over from the cell 2 to the cell 1 for two times, and hands over from the cell 1 to the cell 2 once;
the statistics module is configured to makes statistics on times of occurrences of Scene A and Scene B in the statistics period for the UE.

The above eNB is also characterized in that:
the parameter adjusting module is configured with a step length;
the parameter adjusting module is configured to add the step length to the original handover control parameter stored in the storage module upon receiving the parameter increasing command.

The above eNB is also characterized in that:
the judging module is configured with an adjusting determination parameter Δ;
the judging module is configured to send a parameter increasing command to the parameter adjusting module when it is judged that the times of the serving cell being used as a source cell in the second handover is greater than a sum of the times of being used as a target cell and Δ.

The above eNB is also characterized in that:
the judging module is also configured to send a parameter increasing command to the parameter adjusting module when it is judged that an absolute value of a difference between the times of the serving cell being used as a target cell and the times of being used as a source cell in the second handover is less than Δ.

In regard to the ping-pong handover problem caused by improper configuration of the handover control parameter of the cell, the present invention can identify and position the cell whose parameter needs to be optimized, and can reduce the possibility of occurrence of ping-pong handover radically by means of adjusting the handover parameter of the cell (for example, the Cell Individual Offset), thereby reducing the expenses for the system to realize mobility and optimizing the whole network. Meanwhile, with the self-optimization technique, the present invention can automatically implement scene identification and parameter adjustment, thereby greatly reducing manpower input in the previous network for operation maintenance and making the network operation more conveniently.

PREFERRED EMBODIMENTS OF THE INVENTION

The technical scheme of the present invention will be further described in detail below with reference to the attached drawings and examples.

The basic concept of the present invention is as follows: during a statistics period, eNBs, which serve two adjacent cells involved in a ping-pong handover, make statistics on times of the serving cell of the eNBs being used as a source cell and a target cell in a second handover in a process of each ping-pong handover occurring between the above two adjacent cells respectively; upon end of the statistics period, if the eNB determines that the times of the serving cell of the eNB being used as a source cell in the second handover is greater than the times of being used as a target cell, the eNB increases a value of a handover control parameter of the local cell. Wherein, the handover control parameter includes many aspects, for example, Time to Trigger, Hysteresis, Cell Individual Offset, and Threshold which can all be used as objects of the adjustment.

Figure 1:
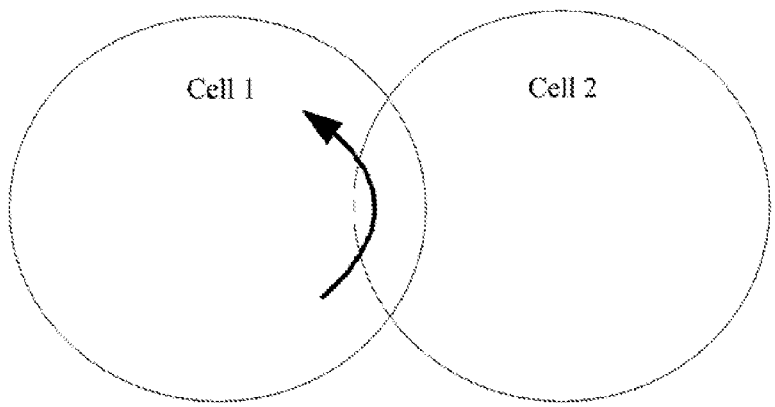
FIG. 1 exemplifies the scene of a ping-pong handover in the prior art.
Figure 2:
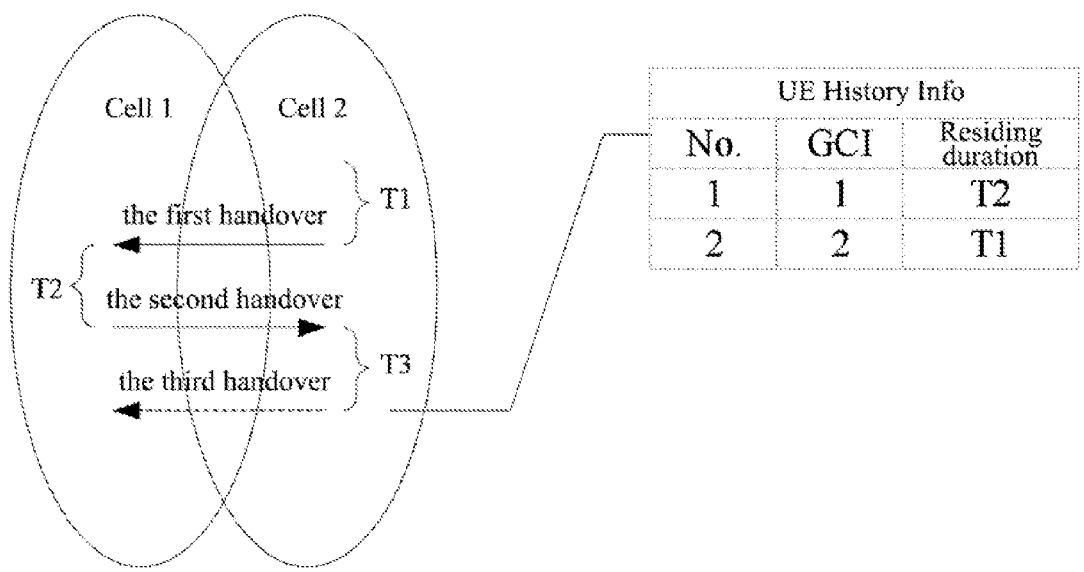
FIG. 2 illustrates identifying a ping-pong handover according to an example of the present invention.

As shown in FIG. 2, in a LTE system, when a UE hands over between the cells, the eNB of the source cell will send the history information of the UE (UE History Info) to the eNB of the target cell, and the cell of UE History Info mainly comprises a list of cells the UE has accessed in the last several times (including the Global Cell Identity (GCI) of the cell that has been accessed), and the residing durations in the above various cells. As shown in FIG. 2, T1, T2 and T3 are residing durations of the UE in various cells, and the eNB can acquire the handover record of the UE according to the UE History Info.

Ping-pong handover can be defined as a case in which a user hands over between two adjacent cells continuously for many times within a short period of time. Therefore, the specific flow of the eNBs of the two adjacent cells respectively judging whether the UE is undergoing a ping-pong handover between the two adjacent cells includes:

1. When the eNB knows that the UE has handed over from or handed over to the serving cell of the eNB, the eNB judges, according to a history information cell of the UE, whether the former two handovers of the UE both occur between the two adjacent cells involved in this handover, if yes, executing step 2; if not, executing step 3;

2. It is judged whether a sum of a residing duration of the UE in each cell after the former two handovers is less than or equal to a preset ping-pong judging threshold value (i.e., judging whether the sum of T2 and T3 in FIG. 2 is less than the preset ping-pong judging threshold value), if yes, it is considered that this handover and the former two handovers constitute a ping-ping handover of the UE between the two adjacent cells; if not, executing step 3;

3. The eNB continuing to wait for the UE to report a handover-to or handover-from notifying message, and executing step 1 after receiving the notifying message.

It can be seen from the above judging flow that if the eNBs of the two adjacent cells judge that the UE has handed over between the two adjacent cells continuously for three times within the duration of the ping-pong judging threshold value, the UE is considered to be undergoing a ping-pong handover between the two adjacent cells.

Figure 3:
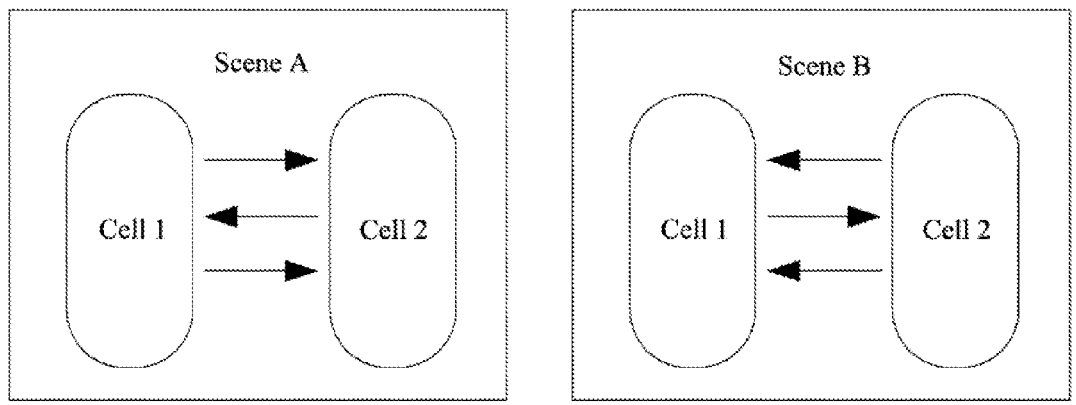
FIG. 3 illustrates specific scene A and scene B for a ping-pong handover according to an example of the present invention.

As shown in FIG. 3, the process that the UE has three handovers continuously between the two adjacent cells includes the following two scenes:

Scene A: the UE continuously hands over between a cell 1 and a cell 2, wherein the UE hands over from the cell 1 to the cell 2 for two times, and hands over from the cell 2 to the cell 1 once; in this ping-pong handover process, the cell 1 is used as a target cell in the second handover, and the cell 2 is used as a source cell;

Scene B: the UE continuously hands over between a cell 1 and a cell 2, wherein the UE hands over from the cell 2 to the cell 1 for two times, and hands over from the cell 1 to the cell 2 once; in this ping-pong handover process, the cell 2 is used as a target cell in the second handover, and the cell 1 is used as a source cell.

Therefore, in the inventive concept, the step of the eNBs making a statistics on times of the serving cell of the eNB being used as a source cells and a target cell in a second handover in a process of each ping-pong handover occurring between the two adjacent cells respectively during a statistics period can be specifically making the statistics on the times of the occurrences of Scene A and Scene B in the statistics period for the UE.

It can be seen that with regard to the cell 1, if the eNB serving the cell identifies that Scene A occurs currently, the eNB serving the cell 2 is sure to be able to identify the occurrence of Scene B, and vise versa, that is, the following formulas are satisfied:

Number of Scenes $A$ in cell 1=Number of Scenes $B$ in cell 2

Number of Scenes $B$ in cell 1=Number of Scenes $A$ in cell 2

Figure 4:
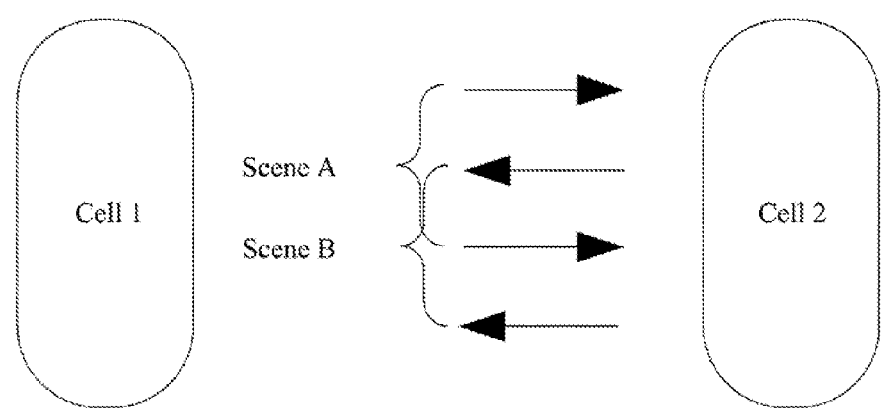
FIG. 4 illustrates the method of making statistics on scene A and scene B for a continuous ping-pong handover according to an example of the present invention.
Figure 5:
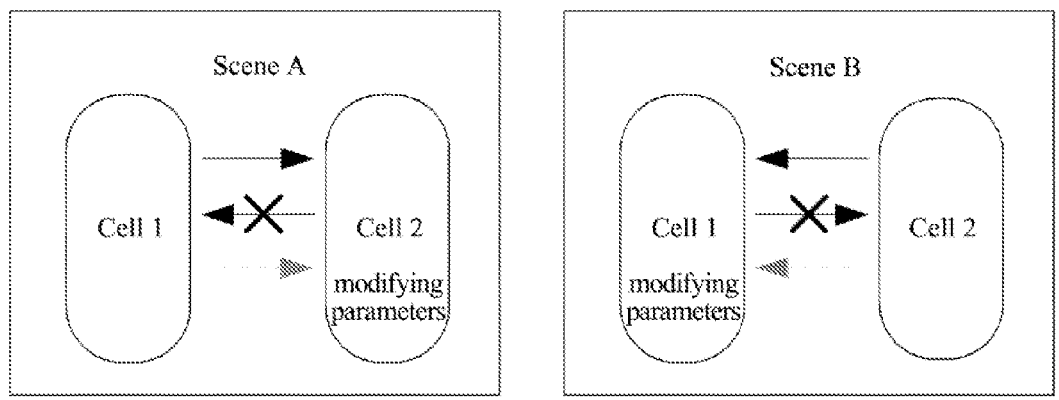
FIG. 5 illustrates adjusting the handover parameter according to the times of scene A and scene B according to an example of the present invention.

If more than three continuous handovers have occurred, a statistics is made according to the method as shown in FIG. 4, i.e., for the cell 1, the former three handovers constitute Scene A, and the second through to the fourth handover constitute Scene B.

In specific implementation, a step length may be configured in the eNB, and increasing the handover control parameter of the serving cell of the eNB may be specifically adding the step length on the basis of the original handover control parameter.

In order to facilitate controlling of the process of adjusting the handover control parameter, the eNB may be also configured with a preset adjusting determination parameter ($\Delta$), and when the eNB determines that the times of the serving cell of the eNB being used as the source cell in the second handover (i.e., the times of occurrence of Scene A) is greater than the times of being used as the target cell (i.e., the times of occurrence of Scene B), the eNB increasing the value of a handover control parameter of the serving cell of the eNB may be specifically implemented as:

the eNB increases the value of the handover control parameter of the local cell when the eNB judges that the times of the serving cell of the eNB being used as the source cell in the second handover is greater than a sum of the times of being used as the target cell and $\Delta$. Correspondingly, the eNB increases the value of the handover control parameter of the serving cell of the eNB when the eNB judges that an absolute value of a difference between the times of the serving cell of the eNB being used as the target cell and the times of being used as the source cell in the second handover is less than $\Delta$; in other cases, the eNB does not adjust the value of the handover control parameter of the serving cell of the eNB.

Description will be made below with two application examples of the present invention.

The parameters involved in the present example include: statistic period (T), ping-pong judging threshold (Thresh), adjusting determination parameter ($\Delta$), handover control parameter and parameter adjusting step length. In a specific example, the method specifically used will be exemplarily described in terms of Cell Individual Offset and Hysteresis. It is regulated in protocol TR36.331 V850 that the adjusting step length for Hysteresis is 0.5 db, and the adjusting step length for cell Individual Offset is 1 dB in the range of [−6 dB~6 dB]. Other parameters can be set specifically in specific implementations so as to change the granularity of the algorithm. The steps for carrying out the present invention and the difference in using different handover control parameters will be described below with reference to the examples.

Example 1

It is assumed that the statistics period is one day, the ping-pong judging threshold is 5s, the parameter adjusting determination parameter is $\Delta$, the counter for counting the Scene A in cell 1 is A, and the counter for counting the Scene B is B.

The eNB serving the cell 1 mainly observes the following two kinds of users:
1) the user in the cell 1, from which the eNB side receives a measurement report and determines a handover, with the target cell being the cell 2;
2) the user that receives a handover-to request message with the handover source cell being the cell 2.

As for the use in 1), judgment is made according to the history information of the user stored in the eNB and the residing duration of the user in the cell 1 currently.

If the list of history cells in the history information is cell 2, cell 1, and the sum of the residing duration in cell 2 and the residing duration in cell 1 currently is less than or equal to 5 s, then it is judged that a ping-pong handover occurs currently, and the counter A for the Scene A in cell 1 is added with 1.

As for the user in 2), a judgment is made according to the history information in the handover-to request message received from the user.

If the list of history cells in the history information is cell 2, cell 1, cell 2, and the sum of the residing duration in cell 2 and the residing duration in cell 1 is less than or equal to 5 s, then it is judged that the ping-pong handover occurs currently, and the counter B for the Scene B in cell 1 is added with 1.

Through the above counting method, the statistics of Scene A and Scene B after one day is observed:
if A>B+$\Delta$, then no processing is implemented;
if B>A+$\Delta$, then the Cell Individual Offset in cell 1 corresponding to cell 2 is added with 1 dB;
if |A-B|<$\Delta$, then the Cell Individual Offset in cell 1 corresponding to cell 2 is added with 1 dB.

The statistics of Scene A and Scene B counted during the present statistics period is cleared, and the statistics of Scene A and Scene B during the next period is observed continually.

Example 2

The current identifying cell is cell 1, which has four adjacent cells, namely, cell 2, cell 3, cell 4 and cell 5 respectively.

It is assumed that the statistics period is one day, the ping-pong judging threshold is 5 s, the parameter adjusting determination parameter is $\Delta$, the four adjacent cells in cell 1 have four pairs of counters for Scene A and Scene B, i.e., A12 and B12, A13 and B13, A14 and B14, A15 and B15, which are used to make the statistics on the ping-pong handover act between cell 1 and a certain corresponding adjacent cell.

The eNB of the cell 1 observes the following two kinds of users for the cell pair composed of cell 1 and each adjacent cell (assuming in the current cell pair, cell 1 and cell 2 are observed):
1) the user in the cell 1, from which the eNB side receives a measurement report and determines a handover, with the target cell being the cell 2;
2) the user that receives a handover-to request message with the handover source cell being the cell 2.

As for the use in 1), a judgment is made according to the history information of the user stored in the eNB and the residing duration of the user in the cell 1 currently.

If the list of history cells in the history information is cell 2, cell 1, and the sum of the residing duration in cell 2 and the residing duration in cell 1 currently is less than or equal to 5 s, then it is judged that the ping-pong handover occurs currently, and the counter $A_{12}$ for the Scene A in cell 1 corresponding to the adjacent cell 2 is added with 1.

As for the user in 2), a judgment is made according to the history information in the handover-to request message received from the user.

If the list of history cells in the history information is cell 2, cell 1, cell 2, and the sum of the residing duration in cell 2 and the residing duration in cell 1 is less than or equal to 5 s, then it is judged that the ping-pong handover occurs currently, and the counter $B_{12}$ for the Scene B in cell 1 corresponding to the adjacent cell 2 is added with 1.

Through the above counting method, the statistics is made on $A_{13}$ and $B_{13}$, $A_{14}$ and $B_{14}$, $A_{15}$ and $B_{15}$ respectively. Each of counters $A_{1x}$ and $B_{1x}$ is observed in one day, and the judging result may be divided into the following three cases:
1) $A_{1x} > B_{1x} + \Delta$;
2) $B_{1x} > A_{1x} + \Delta$;
3) $|A_{1x} - B_{1x}| < \Delta$.

If case 1) is present, as for cell X that satisfies the two cases of 2) and 3), the Cell Individual Offset in cell 1 corresponding to the cell X is added with 1 dB.

If case 1) is not present, and all adjacent cells satisfy case 2) or case 3), then the Hysteresis in cell 1 is added with a step length, 0.5 dB.

The statistics of Scene A and Scene B counted during the present statistics period is cleared, and the statistics of Scene A and Scene B during the next period in cell 1 corresponding to each adjacent cell respectively is observed continually.

Figure 6:
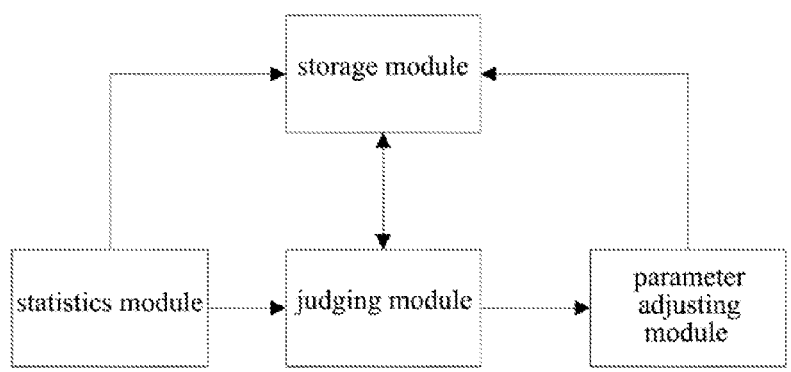
FIG. 6 illustrates the structure of an eNB for avoiding occurrence of ping-pong handover between adjacent cells according to an example of the present invention.

In addition, as shown in FIG. 6, the eNB for avoiding the occurrence of the ping-pong handover between the adjacent cells provided in the present invention comprises a statistics module, a storage module, a judging module and a parameter adjusting module;

the statistics module is used to make statistics on times of the serving cell of the eNB being used as a source cell and a target cell in a second handover in a process of each ping-pong handover occurring between the cell and an adjacent cell, and updating the times to the storage module;

the storage module is used to store information about the times counted by the statistics module and a value of a handover control parameter of the serving cell;

the judging module is used to send a parameter increasing command to the parameter adjusting module if it is judged upon end of a statistics period that the times of the serving cell being used as the source cell in the second handover is greater than the times of being used as the target cell;

the parameter adjusting module is used to increase the value of the handover control parameter of the serving cell stored in the storage module after receiving the parameter increasing command.

Furthermore, the statistics module is also used to determine that a user equipment (UE) is undergoing the ping-pong handover between the serving cell and an adjacent cell if it is judged that the UE has handed over between the two adjacent cells continuously for three times within a duration of a ping-pong judging threshold value.

The process that the UE has undergone three handovers between the two adjacent cells continuously includes the following two scenes:

Scene A: the UE continuously hands over between two adjacent cells, a cell 1 and a cell 2, wherein the UE hands over from the cell 1 to the cell 2 for two times, and hands over from the cell 2 to the cell 1 once;

Scene B: the UE continuously hands over between the cell 1 and the cell 2, wherein the UE hands over from the cell 2 to the cell 1 for two times, and hands over from the cell 1 to the cell 2 once;

Then the statistics module being used to make the statistics on the times of the serving cell of eNB being used as the source cell and the target cell in a second handover in a process of each ping-pong handover occurring between the cell and an adjacent cell is specifically: the statistics module being used to make the statistics on the times of the occurrences of Scene A and Scene B in the statistics period for the UE.

The parameter adjusting module is configured with a step length;

The parameter adjusting module being used to increase the value of the handover control parameter of the serving cell stored in the storage module after receiving the parameter increasing command is specifically: the parameter adjusting module being used to add the step length to the original handover control parameter stored in the storage module upon receiving the parameter increasing command.

The judging module is preset with an adjusting determination parameter Δ;

The judging module being used to send the parameter increasing command to the parameter adjusting module if it is judged upon the end of the statistics period that the times of the serving cell being used as the source cell in the second handover is greater than the times of being used as the target cell is specifically: the judging module being used to send the parameter increasing command to the parameter adjusting module when it is judged that the times of the serving cell being used as the source cell in the second handover is greater than a sum of the times of being used as the target cell and Δ.

The judging module is also used to send the parameter increasing command to the parameter adjusting module when it is judged that an absolute value of a difference between the times of the serving cell being used as the target cell and the times of being used as the source cell in the second handover is less than Δ.

Of course, the present invention may have many other examples, and a person having ordinary skill in the art can make various corresponding modifications and transformations according to the present invention without departing from the sprit and essence of the present invention. These corresponding modifications and transformations, however, shall be within the protection scope defined by the claims of the present invention.

INDUSTRIAL APPLICABILITY

In regard to the ping-pong handover problem caused by improper configuration of the handover control parameter of the cell, the present invention can identify and position the cell whose parameter needs to be optimized, and can reduce the possibility of the occurrence of the ping-pong handover radically by means of adjusting the handover parameter of the cell (for example, the Cell Individual Offset), thereby reducing the expenses for the system to realize mobility and optimizing the whole network. Meanwhile, with the self-optimization technique, the present invention can automatically implement scene identification and parameter adjustment, thereby greatly reducing manpower input in the previous network for operation maintenance and making the network operation more conveniently.

What is claimed is:

1. A method for avoiding the occurrence of ping-pong handovers by a UE in the connected state between adjacent cells, comprising:
   presetting an adjusting determination parameter Δ in an evolved Node B (eNB);
   during a statistics period, the evolved Node B (eNB) in a long term evolution (LTE) system serving cell determining the ping-pong handovers between the serving cell and an adjacent cell occurred when said eNB determines a user equipment (UE) has been handed over between the serving cell of the eNB and the adjacent cell continuously for at least three times within a duration of a ping-pong judging threshold value;
   wherein said eNB considers each three times that the UE is handed over between the serving cell of the eNB and the adjacent cell continuously within the duration of the ping-pong judging threshold value as one ping-pong handover;
   at the end of the statistics period, the eNB increasing a value of a handover control parameter of the serving cell of the eNB when the eNB judges that the times of the serving cell of the eNB being the source cell in the second handover of all ping-pong handovers is greater than a sum of the times of the serving cell of the eNB being the target cell in the second handover of all ping-pong handovers and Δ, or when the eNB judges that the absolute value of the difference between the times of the serving cell of the eNB being the target cell and the times of the serving cell of the eNB being the source cell in the second handover of all ping-pong handovers is less than Δ.

2. The method according to claim 1, wherein,
   said step of determining the ping-pong handovers between the serving cell and the adjacent cell comprises:
   A. when the eNB knows that the UE has handed over from or handed over to the serving cell of the eNB, the eNB judging according to a history information cell of the UE whether former two handovers of the UE both occur between the two cells involved in this handover, if yes, executing step B; if not, executing step C;
   B. judging whether a sum of residing durations of the UE in each cell after the former two handovers is less than or equal to a preset ping-pong judging threshold value, if yes, it is believed that this handover and the former two handovers constitute a ping-ping handover of the UE between the two adjacent cells; if not, executing step C;
   C. the eNB continuing to wait for the UE to report a handover-to or handover-from notifying message, and executing step A after receiving the notifying message.

3. The method according to claim 2, wherein,
   the process that the UE has handed over between the two adjacent cells continuously for three times includes following two scenes:

Scene A: the UE continuously hands over between the two adjacent cells, a cell 1 and a cell 2, wherein the UE hands over from the cell 1 to the cell 2 for two times, and hands over from the cell 2 to the cell 1 once;

Scene B: the UE continuously hands over between the cell 1 and the cell 2, wherein the UE hands over from the cell 2 to the cell 1 for two times, and hands over from the cell 1 to the cell 2 once;

the eNB makes a statistics on times of occurrences of Scene A and Scene B in the statistics period for the UE.

4. The method according to claim 1, wherein, the process that the UE has handed over between the two adjacent cells continuously for three times includes following two scenes:

Scene A: the UE continuously hands over between the two adjacent cells, a cell 1 and a cell 2, wherein the UE hands over from the cell 1 to the cell 2 for two times, and hands over from the cell 2 to the cell 1 once;

Scene B: the UE continuously hands over between the cell 1 and the cell 2, wherein the UE hands over from the cell 2 to the cell 1 for two times, and hands over from the cell 1 to the cell 2 once;

the eNB makes a statistics on times of occurrences of Scene A and Scene B in the statistics period for the UE.

5. The method according to claim 1, wherein, the eNB is configured with a step length;

said step of the eNB increasing the value of the handover control parameter of the serving cell of the eNB comprises: adding the step length to the original handover control parameter.

6. The method according to claim 5, wherein, the handover control parameter includes any one of Time to Trigger, Hysteresis, Cell Individual Offset, and Threshold, and any combination thereof.

7. The method according to claim 1, further comprising:

the eNB not adjusting the value of the handover control parameter of the serving cell of the eNB when the eNB judges that the times of the serving cell of the eNB being used as the target cell in the second handover of all ping-pong handovers is greater than a sum of the times of the serving cell of the eNB being used as the source cell in the second handover of all ping-pong handovers and A.

8. The method according to claim 1, wherein, the handover control parameter includes any one of Time to Trigger, Hysteresis, Cell Individual Offset, and Threshold, and any combination thereof.

9. An Evolved Node B (eNB) in a long term evolution (LTE) system for avoiding the occurrence of a-ping-pong handovers by a UE in the connected state between adjacent cells, comprising: a statistics module, a storage module, a judging module and a parameter adjusting module;

the statistics module is configured to determine, during a statistics period, the ping-pong handovers between the serving cell and an adjacent cell occurred when determining a user equipment (UE) has been handed over between the serving cell of the eNB and the adjacent cell continuously for at least three times within a duration of a ping-pong judging threshold value; wherein said statistics module considers each three times that the UE is handed over between the serving cell of the eNB and the adjacent cell continuously within the duration of the ping-pong judging threshold value as one ping-pong handover;

the storage module is configured to store a value of a handover control parameter of the serving cell;

the judging module is configured with an adjusting determination parameter $\Delta$, and the judging module is configured to, at the end of the statistics period, send a parameter increasing command to the parameter adjusting module when judging that the times of the serving cell of the eNB being used as the source cell in the second handover of all ping-pong handovers is greater than a sum of the times of the serving cell of the eNB being used as the target cell in the second handover of all ping-pong handovers and $\Delta$, or when judging that the absolute value of the difference between the times of the serving cell of the eNB being used as the target cell and the times of the serving cell of the eNB being used as the source cell in the second handover of all ping-pong handovers is less than $\Delta$;

the parameter adjusting module is configured to increase the value of the handover control parameter of the serving cell stored in the storage module after receiving the parameter increasing command.

10. The eNB according to claim 9, wherein, a process that the UE has undergone three handovers between the two adjacent cells continuously includes following two scenes:

Scene A: the UE continuously hands over between two adjacent cells, a cell 1 and a cell 2, wherein the UE hands over from the cell 1 to the cell 2 for two times, and hands over from the cell 2 to the cell 1 once;

Scene B: the UE continuously hands over between the cell 1 and the cell 2, wherein the UE hands over from the cell 2 to the cell 1 for two times, and hands over from the cell 1 to the cell 2 once;

the statistics module is configured to makes a statistics on times of occurrences of Scene A and Scene B in the statistics period for the UE.

11. The eNB according to claim 9, wherein, the parameter adjusting module is configured with a step length;

the parameter adjusting module is configured to add the step length to the original handover control parameter stored in the storage module upon receiving the parameter increasing command.

* * * * *